United States Patent [19]
Leonard

[11] 3,850,126
[45] Nov. 26, 1974

[54] FLUID CUSHION SUPPORTED VEHICLES

[75] Inventor: John Charles Leonard, Isle of Wight, England

[73] Assignee: British Hovercraft Corporation Limited, Yeovil, Somerset, England

[22] Filed: Apr. 19, 1973

[21] Appl. No.: 352,678

[30] Foreign Application Priority Data
May 5, 1972 Great Britain .................... 21071/72

[52] U.S. Cl. ................ 114/67 A, 180/117, 180/121
[51] Int. Cl. ............................................. B63b 1/38
[58] Field of Search ......... 114/67 R, 67 A; 180/117, 180/120, 121

[56] References Cited
UNITED STATES PATENTS

| | | | |
|---|---|---|---|
| 2,988,035 | 6/1961 | Gram | 114/67 A |
| 3,373,837 | 3/1968 | Guienne | 180/121 X |
| 3,438,457 | 4/1969 | Guienne et al. | 180/121 |
| 3,478,836 | 11/1969 | Eckered et al. | 114/67 A X |
| 3,742,888 | 7/1973 | Crowley | 114/67 A |
| 3,799,095 | 3/1974 | Bertin | 114/67 A |

FOREIGN PATENTS OR APPLICATIONS

| | | | |
|---|---|---|---|
| 893,715 | 4/1962 | Great Britain | 114/67 A |

*Primary Examiner*—Lloyd L. King
*Assistant Examiner*—Randolph A. Reese
*Attorney, Agent, or Firm*—Larson, Taylor and Hinds

[57] ABSTRACT

A vehicle which in operation receives support from a cushion of pressurized fluid formed in a cushion area beneath the vehicle and having means dividing the cushion area into compartments situated at the front and rear of the vehicle, is provided with means connecting said front compartments to said rear compartments so that pressurized fluid can be allowed to flow therebetween in a controllable manner.

9 Claims, 4 Drawing Figures

FLUID CUSHION SUPPORTED VEHICLES

This invention is concerned with fluid cushion supported vehicles and more particularly it concerns the control of fluid cushion pressure according to the load being carried by the vehicle.

According to the invention we provide a vehicle which in operation receives support from a cushion of pressurized fluid formed in a cushion area beneath the vehicle, the vehicle being provided with means bounding the cushion area which restrict lateral escape of the pressurized fluid therefrom and means dividing the cushion area into compartments situated at the front and rear of the vehicle, wherein one or more passages connect at least one compartment at the rear of the vehicle with at least one compartment at the front of the vehicle, selectively operable obturator means being provided in each passage for controlling the flow of pressurized fluid therethrough between the said front and rear compartments.

The fluid cushion vehicle may have a rigid buoyancy compartment which supports the vehicle upon water when it is not fluid cushion supported. Preferably passages for the transfer of pressurized fluid are situated within the buoyancy compartment.

Figure 1:
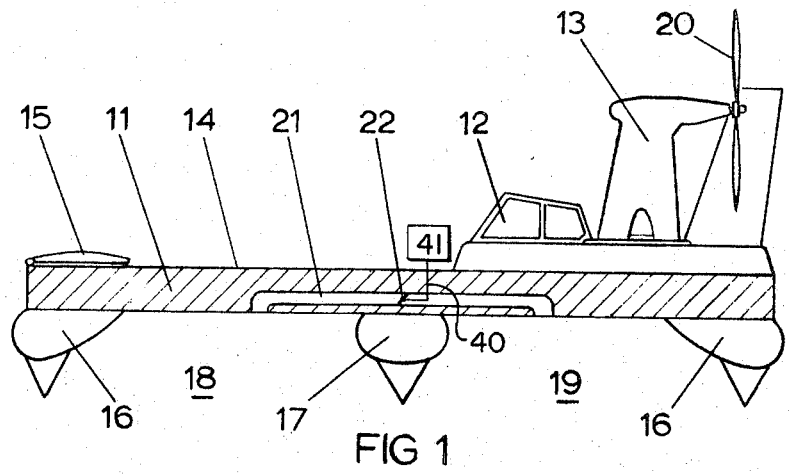
Figures 2, 3:
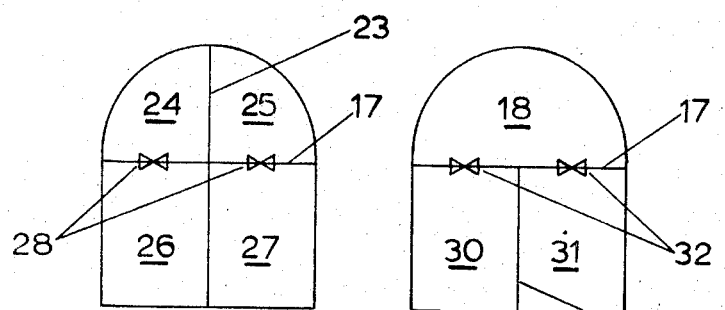
Figure 4:
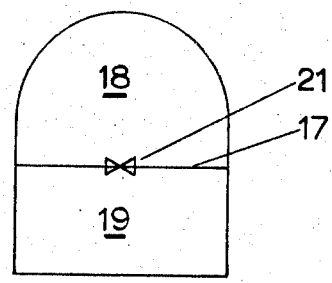

One embodiment of the invention will now be described, by way of example only, with reference to the accompanying drawings, in which:

FIG. 1 is a schematic, part sectioned, side elevation of a fluid cushion supported vehicle according to the invention, and FIGS. 2 to 4 illustrate diagrammatically various divisions of the pressurized fluid cushion.

Referring to FIG. 1, a fluid cushion supported vehicle structure has a rigid buoyancy compartment 11 which provides support for a crew cabin 12 and a control and propulsion pylon 13. The buoyancy compartment 11 has a flat open fore deck 14 for the carriage of freight which may be loaded by way of a pivotal bow loading ramp 15.

Depending below the periphery of the buoyancy compartment 11 are flexible skirts 16 which in a preferred embodiment of the invention are of the type having an upper pressurized member from which depends a plurality of discrete segments which is known per se, as shown in U.S. Pat. No. 3,502,168. The fluid cushion area defined by the flexible skirts 16 is divided by a lateral stability barrier 17 into a compartment 18 at the front of the vehicle and a compartment 19 at the rear of the vehicle.

The vehicle is propelled by an air propeller 20, and pressurized air for the cushion is supplied by a fan (not shown). The fluid, as delivered from the vehicle structure to the cushion area below the vehicle structure is referred to as the "primary" fluid.

A passage 21 in the buoyancy compartment 11 has one end open to the compartment 18 at the front of the vehicle and its other end open to compartment 19 at the rear of the vehicle. The passage 21 provides a path by which fluid may be transferred between the compartments 18 and 19. The rate of transfer of fluid can be controlled by valve means 22 situated in the passage 21. The valve means 22 may be a simple butterfly valve or any other suitable valve means, operated manually, for example by the commander of the vehicle or arranged to operate automatically according to ride characteristics of the vehicle as for example, along line 40 from control means 41. These characteristics may depend, for example, on the trim of the vehicle or the state of the sea over which the vehicle is operating.

In operation, if the fore deck 14 of the vehicle is fully loaded the cushion pressure of the front compartment 18 may be 65 lbs./ft.$^2$ and the pressure in the rear compartment 19 may be 45 lbs./ft.$^2$ These pressures are achieved by the areas of the outlet ports (not shown) in the main fluid cushion distribution duct for primary fluid being larger in the front of the vehicle than in the rear. In the preferred embodiment of the invention the upper pressurized member of the skirt 16 acts as the main distribution duct for primary fluid having outlet ports (not shown) to the compartments 18 and 19. As the outlet port areas are fixed when the skirt 16 is built there is no method of adjusting the compartment pressures according to the load being carried.

When the fore deck 14 is lightly loaded it is necessary to reduce the pressure in the front compartment 18 so that the vehicle can travel with an even trim. This is achieved by opening the obturator means 22 to allow pressurized fluid to transfer from the front compartment 18 to the rear compartment 19. The rate of transfer of pressurized fluid through the duct 21 and hence the trim of the vehicle is controlled by the amount which the obturator means 22 is opened. Therefore, the obturator means 22 is arranged so that it may be held in a partially open position at any point in the range between the fully open position and the fully closed position.

A plan of the compartmentation arrangement of the vehicle illustrated in FIG. 1 is shown in FIG. 4. The invention is also applicable to vehicles having other compartmentation arrangements, two such arrangements being illustrated in FIGS. 2 and 3. In FIG. 2 a full length keel barrier 23 together with the lateral stability barrier 17 divides the fluid cushion area into two compartments 24 and 25 at the front of the vehicle and two compartments 26 and 27 at the rear of the vehicle. Valved passages represented by 28 interconnect the front compartments 24 and 25 and the rear compartments 26 and 27.

In FIG. 3 a part length keel barrier 29 divides the cushion area aft of the lateral stability barrier 17 into two compartments 30 and 31. Valved passages represented by 32 interconnect the two rear compartments 30 and 31 with the front compartment 18.

It will be appreciated that the transfer passages may be situated in any convenient position, and need not be arranged within the buoyancy compartment.

I claim as my invention:

1. A payload carrying ground effect vehicle comprising:

a vehicle structure having a front portion and a rear portion, the front portion comprising means for carrying the major part of the weight of the payload, boundary means extending downwardly from the vehicle structure for defining a cushion area beneath said front and rear portions, the boundary means restricting the lateral escape of pressurized fluid within the cushion area so that pressurized fluid within the cushion area supports the weight of the vehicle, partition means extending transversely across the vehicle for separating the entire cushion area into a forward cushion compartment and a rearward cushion compartment situated below the front and rear portions of the vehicle, respectively, passage means for delivering primary pressurized fluid from the vehicle body directly and simultaneously into both said forward and said rearward compartments, said passage means defining means for delivering a higher volume flow of pressurized fluid to the forward compartment to create a higher cushion pressure in the forward compartment, such that the pressures in the forward and rearward compartments will provide correct trim of the vehicle when operating with full payload, and at least one passage placing said forward and rearward compartments into fluid communication with each other, a variable valve means in said passage for varying the size of the passageway and hence the flow of fluid between said forward and rearward compartments to adjust the pressure difference between said forward and rearward compartments and correct the trim of the vehicle when it is carrying less than a full payload.

2. A vehicle as claimed in claim 1, wherein each passage for transferring pressurized fluid between the compartments is situated within a rigid buoyancy compartment forming part of vehicle structure.

3. A vehicle as claimed in claim 1, wherein the valve means is manually operable.

4. A vehicle as claimed in claim 1 including means for operating the valves automatically.

5. A vehicle as claimed in claim 1, wherein the valve means is arranged so that it can be held in any position between the range fully open and fully closed.

6. A vehicle as claimed in claim 1, wherein the means for restricting the escape of pressurized fluid from the cushion area comprises a flexible skirt assembly.

7. A vehicle as claimed in claim 6, wherein the flexible skirt assembly comprises an upper pressurized member having flexible segments depending therefrom.

8. A vehicle according to claim 6, said flexible skirt including an upper pressurized member, and said passage means comprising a fluid path from the vehicle structure into said upper pressurized member and from said upper pressurized member directly into both of said compartments.

9. A vehicle as claimed in claim 1, said means for delivering a higher volume flow of pressurized fluid comprising an outlet area delivering pressurized fluid from the passage means to the forward compartment which is larger than the outlet area delivering pressurized fluid from the passage means to the rearward compartment.

* * * * *